Feb. 13, 1934.　　　　　E. S. BUSH　　　　　1,947,033
CLUTCH AND TRANSMISSION MECHANISM
Filed Jan. 9, 1932　　　　3 Sheets-Sheet 1
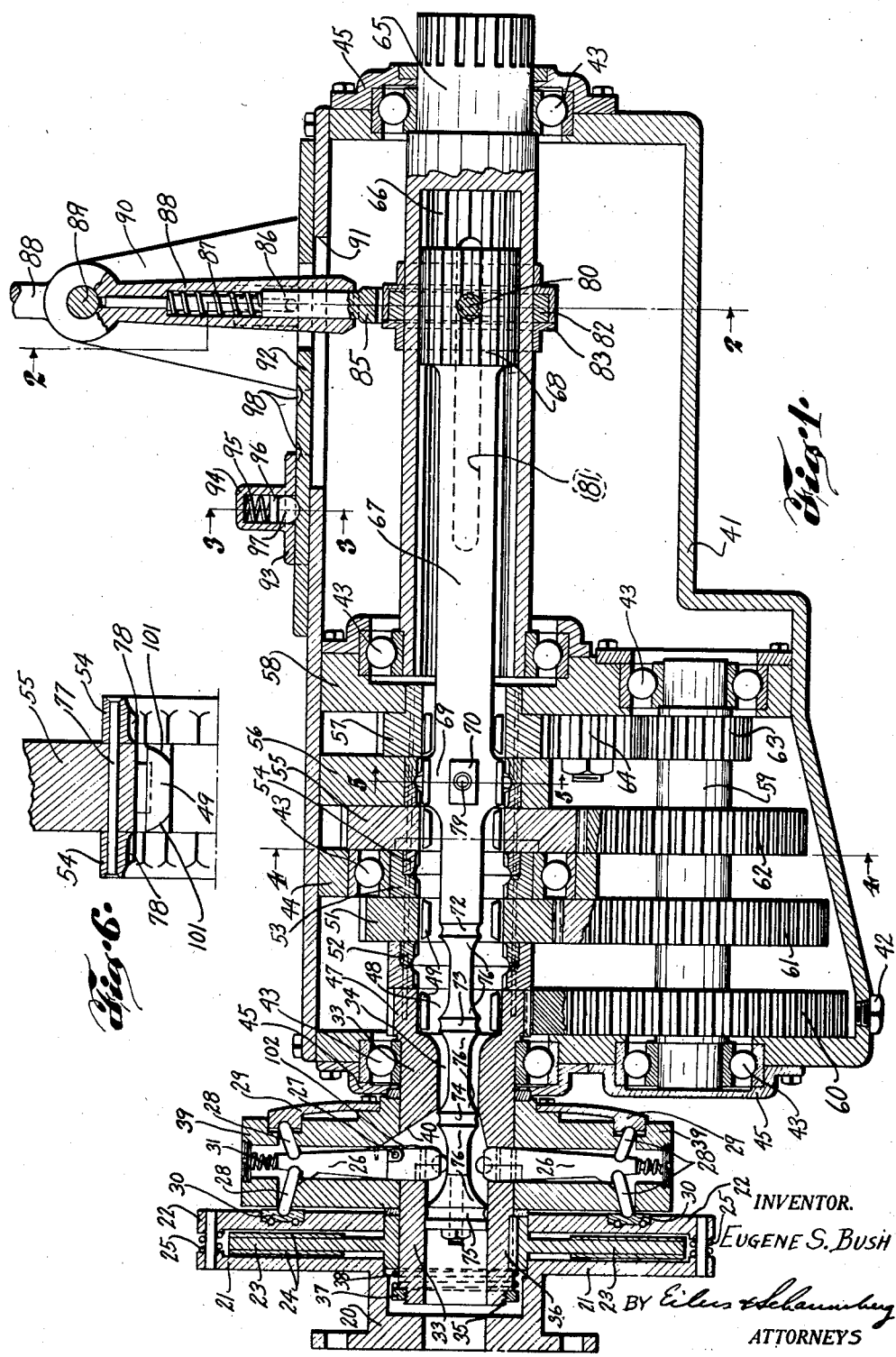
INVENTOR.
EUGENE S. BUSH
BY Eilers & Schaumberg
ATTORNEYS Feb. 13, 1934.  E. S. BUSH  1,947,033
CLUTCH AND TRANSMISSION MECHANISM
Filed Jan. 9, 1932  3 Sheets-Sheet 2
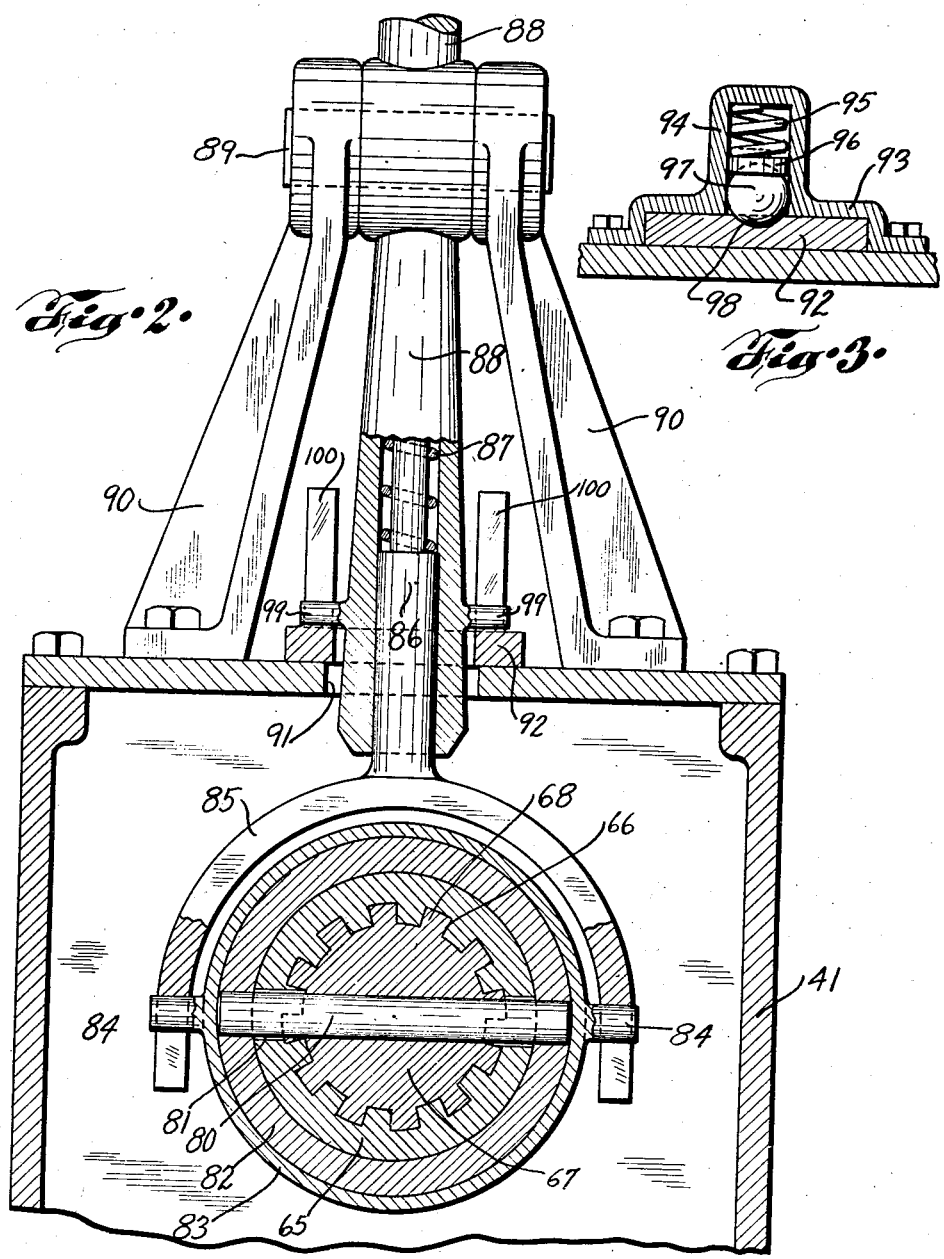
INVENTOR.
EUGENE S. BUSH
BY
ATTORNEYS Feb. 13, 1934.　　　　E. S. BUSH　　　　1,947,033
CLUTCH AND TRANSMISSION MECHANISM
Filed Jan. 9, 1932　　　3 Sheets-Sheet 3
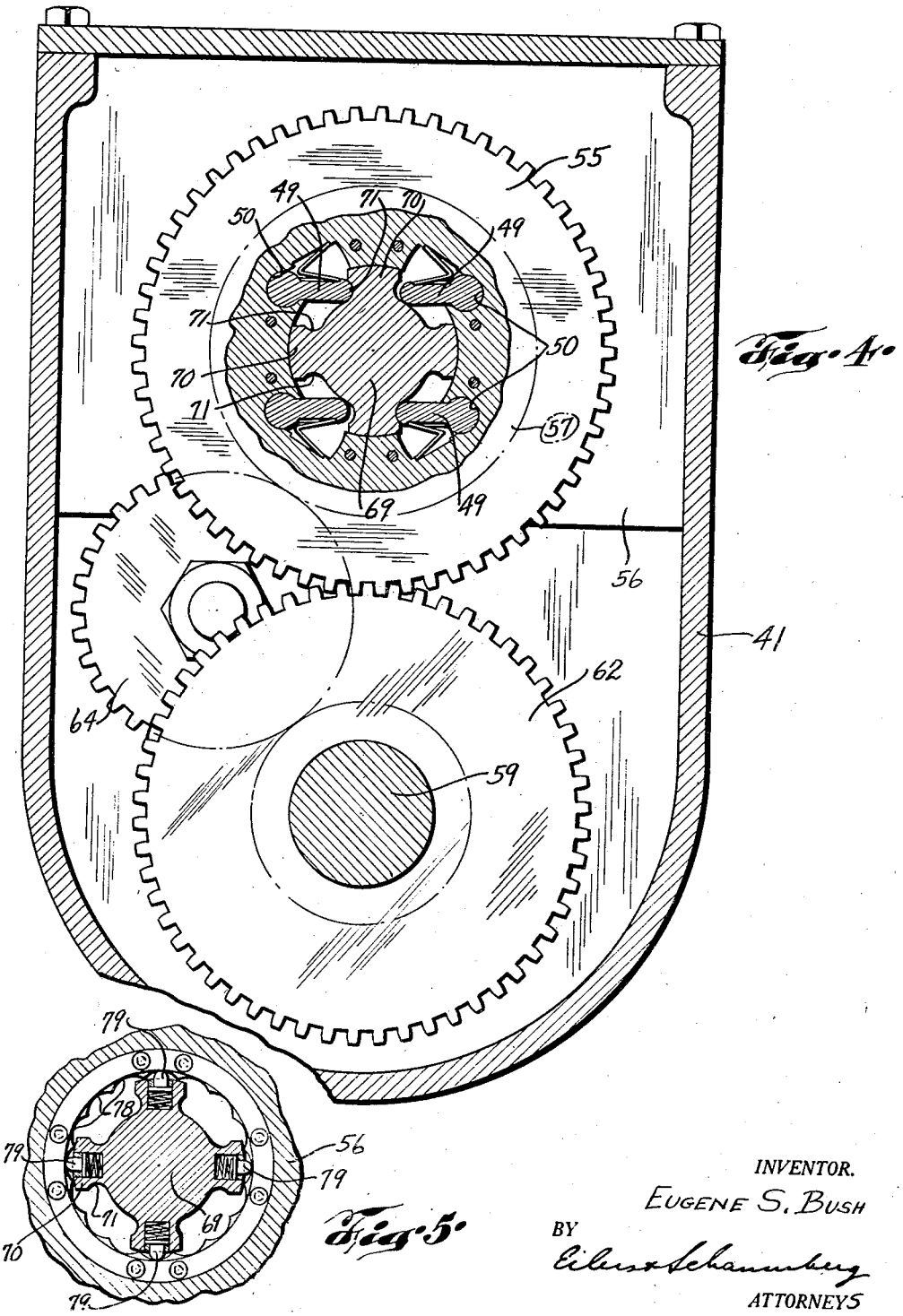
INVENTOR.
EUGENE S. BUSH
BY
ATTORNEYS Patented Feb. 13, 1934

1,947,033

UNITED STATES PATENT OFFICE

1,947,033

CLUTCH AND TRANSMISSION MECHANISM

Eugene S. Bush, St. Louis, Mo., assignor to Bush Manufacturing Company, St. Louis, Mo., a corporation of Missouri Application January 9, 1932. Serial No. 585,683

20 Claims. (Cl. 192—3.5)

This invention relates to improvements in clutch and transmission mechanism, and more particularly to a transmission and clutch assembly of a type adapted for use in automotive vehicles. The present application constitutes a continuation in part of a copending application heretofore filed by me February 11, 1931, and bearing Serial No. 514,953.

Among the objects of the present invention, there may be noted the simplification of the control operations heretofore usually necessary to effect changes in the connections and effective gear ratio between the driving and driven portions of a transmission assembly; the creation of a transmission of improved type in which provision is made for a so-called "progressive" type of control, and in which the transmission is of an improved constant mesh type.

Another object of the invention is attained in the provision of a combination clutch and transmission assembly having its parts so arranged that a single manual control member serves effectively and simultaneously to control both the speed change members, as well as appropriately timed engagements and disengagements of a clutch, such as a friction clutch, associated therewith; provision being made for definite automatic sequential control movements of a friction clutch coordinately with the control of the speed-change elements of the structure.

Yet another object of the invention is attained in the provision of improved means for insuring, as involving a negligible additional effort on the part of an operator, a proper, predetermined, sequential actuation of a friction clutch, responsive to predetermined placements of a speed change control member.

Objects other than those enumerated above, will be suggested by the description and accompanying drawings of a preferred executional embodiment of the invention. In the drawings:

Fig. 1 is a vertical sectional elevation of a clutch and transmission assembly constructed according to the present invention; Fig. 2 is a sectional elevation, transverse to that of Fig. 1, and taken along line 2—2 thereof; Fig. 3 is a fragmentary enlarged sectional elevation along line 3—3 of Fig. 1, showing an arrangement for notching the speed control member, removably in its predetermined control positions; Fig. 4 is an enlarged vertical sectional elevation along line 4—4 of Fig. 1, showing certain details of construction, particularly the structure employed for effecting a driving relation between the transmission control shaft, and certain of the gears of the transmission; Fig. 5 is an enlarged sectional elevation along line 5—5 of Fig. 1 and illustrating a preferred form of synchronizing arrangement; and Fig. 6 is a fragmentary sectional elevation of a half portion of one of the transmission gears.

Proceeding now to a description of the drawings by characters of reference thereto, an engine or other suitable prime mover (not shown) may be connected to a flanged shaft 20, provided with an axial bore, one end of this shaft being flanged or extended radially to form a clutch disc 21, with which is paired, in opposed relation, a clutch member 22. There is provided between the members 21 and 22, a third clutch element 23, the opposite faces of which are preferably provided with friction facings 24. Disposed between the members 21 and 22 in such a manner as to bias these members apart or toward clutch disengaging position, are a plurality of coil springs 25, each carried on a suitable supporting pin and disposed about the periphery of the clutch. Actuation of the clutch is effected through a series of radially disposed plungers 26, one group of which is provided with a hinged, spring loaded inner end portion, the hinge being shown at 27, and another group of which is of non-pivoted construction. Preferably six such plungers are employed, three of which are of the hinged type, and another group of three being of the non-pivoted or rigid type. Provision is made, as will hereinafter appear, for imparting an outward radial movement to the plungers 26, to cause clutch engagement. Suitably seated in recesses in the plungers are a plurality of toggle arms or levers 28 which, upon outward movement of the plungers, coact with a spring member 29, to press the clutch plates 22 and 23 toward the plate 21 in a manner to cause engagement of the clutch. The member 22 is provided with a metal insert 30, in the nature of a wearing ring, relative to which the plate 22 may be rotated, and against which the outermost projecting ends of the longer toggle levers 28 impinge, in a manner to cause clutch engagement. A plurality of springs 31, one for each of the plungers 26, tends to keep the plungers disposed inwardly toward the axis of rotation of the assembly and hence in a position such that the plates 21, 22 and 23 are in clutch-disengaged position. It will appear from Fig. 1 that the hinged plungers are of somewhat greater length, and thus project inwardly to a greater extent, than the opposite group of plungers of rigid construction. This provision is made for a purpose which will more clearly appear in the description of the operation of the assembly.

The foregoing and other details of the clutch construction and operation will more fully appear from my copending application, filed December 2, 1931, and bearing Serial No. 578,509, directed to the clutch assembly, per se.

As shown in Fig. 1, the clutch member 21 is by preference formed integrally with the shaft section 20. Serving among other purposes, as a means for carrying the clutch members 22 and 23, there is provided a hollow shaft, indicated generally at 33, which is provided with a longitudinal bore 34, a threaded end 35, and a portion 36 of slightly larger diameter which may be splined or provided with a keyway for the purpose of maintaining rotative or operative connection between the shaft 33, and the clutch element 23. The threaded portion 35 serves to receive a retaining nut 37, which in turn serves to position a clutch spring 38, kept in place by the nut 37, and being a compression spring, so that it tends to bias the clutch member 23 into clutch disengaging relation. As clearly shown in Fig. 1, clutch plungers 26, the toggle members 28 and related mechanism, are enclosed within a cylindrical housing 39, and that portion of shaft 33 which is disposed within the housing, is provided with radial openings to permit the inner ends of the plungers 26 to project into the hollow portion of the shaft for purposes of actuation by means hereinafter appearing. Certain of the openings directed, for the plungers, to the interior of the shaft 33, are undercut, as shown at 40, to permit a swinging movement of the lower hinged ends of one group of plungers 26, to the right (Fig. 1), for purposes later discussed.

Proceeding now to a description of the parts of the transmission proper, the gears and certain of the control parts of the transmission are carried by and within a gear case 41 adapted to contain a suitable body of lubricant, and provided with a drain plug 42, a removable cover and preferably ball or roller bearing assemblies 43, suitably disposed in the opposite end walls of the case, and also, as may be desired, carried by a transverse bearing arm or wall 44, and at other desired points. As a means of preventing escape of lubricant about or through the bearings, and for providing access thereto, closure caps 45 may be provided adjacent the bearings, particularly those in the outside walls of the case.

As shown in Fig. 1, the shaft 33 extends inwardly of the forward and upper portion of the case 41 and carries, adjacent the forward end wall of the case, a gear 47, which may be milled as an integral part of shaft 33 or may be secured thereto as by a key (not shown) and thus compelled to rotate therewith. Beyond the gear 47, the shaft 33 terminates in a well portion 48, within which is disposed, by preference, a plurality, say four, spring pressed pawls 49 (Fig. 4), the seats for the pawls being indicated at 50. By preference these pawls are of a length only slightly less than that of the gear with which they are associated, the pawls being disposed for movement within the seat 50, in a direction to enable the several pawls to be moved, selectively, within and without the well portion 48. Disposed adjacent the well 48 of gear 47, is a gear 51 provided with a sleeve portion 52 serving as a bearing for gear 51 and for the gear 47, the opposite side of the gear 51 being extended to form a sleeve portion 53, which operates internally of a bearing 43, within the intermediate transverse bearing arm 44, supported as from the sides of the case. Journaled, in turn, in the portion 53, is a lateral bearing extension 54, carried by gear 55 and forming a journal therefor. The opposite side of the gear 55 may be in like manner provided with a sleeve disposed within a fixed journal member 56, which serves also to receive a corresponding sleeve of a reverse gear 57, provided with a lateral journal extension disposed in rotative relation in a bearing arm member 58 carried by the case.

Disposed alongside, or below, and in parallel relation to the shaft 33 and to the axes of the several gears 47, 51, 55 and 57, is a countershaft 59 to which may be secured, as by keys or splines (not shown) a first speed driven gear 60, and proceeding thence to the right (Fig. 1) gears 61, 62 and 63, there being for purposes of reverse operation, an idler gear 64, interconnecting the gears 63 and 57. It will appear that the described relation of the gear elements permits the gears to be intermeshed at all times, as shown, so as to obviate the usual bodily movement of certain of the gears for purposes of effecting changes in speed ratio. As appears, the gear 47 is always in driving relation with the gear 60; thus whenever the friction clutch is engaged, with the engine in operation, the gear 47 and therewith all of the other gears of the transmission are always in rotation. It will be apparent from Fig. 1, that upon effecting a selective operative connection with the several gears 47, 51, 55 and 57, there may be attained three different gear ratios, all in the same direction, as for forward speeds, and, due to the idler gear 64, a reverse driving connection may be effected through the gear 57, the gear 57 being rotated in a direction relatively opposite to that of gears 47, 51 and 55.

The power take-off element of the illustrated structure consists of a shaft 65, which may constitute the usual propeller shaft of an automotive vehicle, and which is journaled within the transmission in spaced bearing assemblies 43. The end of the shaft 65 within the case 41, is hollow and internally splined, the splines being shown at 66. Disposed for endwise, axial, sliding movement within the hollow portion of shaft 65 is an intermediate transmission shaft 67, having one or its right hand end (Fig. 1) externally splined as at 68 so as to be always in operative driving engagement with the shaft 65 irrespective of an endwise movement of shaft 67, permitted through its splined connection. Disposed upon an intermediate portion of the shaft 67 is a driving head indicated generally at 69, shown in section in Fig. 4 and characterized, in the present example, by four radial projections or pawl abutments 70, the opposite sides of the radial arms or abutments being characterized by grooved, parallel, pawl engaging surfaces 71. It will appear that the length of the arms 70 is determined upon according to the width of each of the gears 47, 51, 55 and 57 and also, by preference, corresponds substantially to the length of the individual pawls 49. It will also appear that with each of the gears 47, 51, 55 and 57 is provided an engaging seat or zone for the driving head 69, and that the engaging seats are spaced a distance at least equal to, and preferably slightly greater than, the length of the arms 70. By this arrangement it is impossible for the arms 70 operatively to engage, in driving or driven relation, more than one of the gears, at a time, and as will hereinafter appear, the well portions or zones of repose between the gears, constitute pockets into which the driving head 69 may be withdrawn merely upon a slight movement of the control, for a purpose of attaining an overrun clutch effect.

Proceeding further with a description of the shaft 67, its left hand (Fig. 1) or clutch-controlling end, is characterized by a series of spaced clutch-actuating heads 72, 73, 74 and 75, each consisting of a portion of relatively enlarged diameter merging into the intervening portions of lesser diameter of the shaft, through sloping or tapered cam surfaces 76. It will appear that the clutch operating head 75 is of relatively larger diameter than that of heads 72, 73 and 74, so that the head 75 alone, is of sufficient diameter to engage, operatively, the shorter rigid plungers 26 of the clutch assembly.

It will further appear that the spacing between centers of the clutch operating heads 72—75, corresponds substantially to the spacing between centers of the pawl wells, within the gears 47, 51, 55 and 57, from which it will appear that a sequence of clutch control movements is effected, each actuation of the clutch toward engaged position, being brought about at a time when the driving head 69 of shaft 67 is disposed within one of the gears 47, 51, 55 or 57.

It may here be noted that actuation of the clutch into engaged position takes place through the engagement of one of the cam surfaces 76 which, as the shaft 67 is moved, say to the left (Fig. 1) would serve to move one or the longest group of plungers 26, radially outwardly, bringing the toggle arms 28 toward centering relation and causing a frictional engagement between the plates 21, 22 and 23. As long as the shaft 67 is in this position, the affected group of plungers 26 will be held in their outward or clutch engaging position.

In the example of the invention presently illustrated, it will be seen that each of the gears 47, 51, 55 and 57 is provided on one or both of its faces with lateral extensions; for example in the case of gear 55 these extensions, best appearing in Fig. 6, may be formed integrally with the gear, or for purposes of milling, are preferably assembled thereto, as by a series of pins 77. The projections 54, besides serving as bearing portions for certain of the gears, are provided on their inner peripheries with a plurality of indentations or shallow notches 78, adapted to coact with spring-pressed plungers 79, one of such plungers with its associated spring being disposed in a well within each of the radial arms 70, of the driving head. It will appear that, as the member 67 is moved endwise to a position in which the driving head 69 is about to be brought into one of the associated gears, the plungers 79 will engage the grooves 78 in a manner to tend almost immediately to bring the gear and shaft 67, to a corresponding speed. Thus, the gear about to be engaged by the driving head 69 is automatically brought into synchronism with the shifting member, in advance of its actual operative engagement therewith.

As a means for effecting endwise movements of the shaft 67 for purposes of coordinated control of the friction clutch and speed change elements of the transmission, there is employed preferably an arrangement best shown in Fig. 2 as consisting of a transverse pin 80, projecting through a diametral opening in the splined head of shaft 67, thence through diametrally opposed slots 81, in the hollow portion of shaft 65, and outwardly to terminate in a rotating collar 82. The collar 82 is surrounded by a circular member 83 secured against rotation as by laterally projecting pins 84 pivoted in the end portions of a shifting yoke 85. The yoke 85 is provided with an upwardly projecting stem 86 having a portion of reduced diameter, about which is disposed and retained a spring 87, the stem 86 being telescopically maintained within a hollow end of a lever 88, provided with a pivot 89, pivot arms 90 for which may be bolted to the top of the case. It will appear from the telescoping arrangement of the stem 86 and lever 88, that there is thereby avoided any tendency of the parts 82 and 83 to any twisting or cramping effects as the lever is moved beyond its central or neutral position illustrated in Fig. 1. The lever 88 may obviously be continued upwardly or outwardly of its pivot to form a control lever of desired length.

Since the portions 86 and 88 receive an endwise movement of substantial range, it may be desirable to provide in the case cover, a slot 91, of suitable length, and for the purpose of confining a lubricant, a slot closure or cover 92. This member is preferably apertured only sufficiently to accommodate the inner or lower end of lever 88. It will appear that as the lever is shifted for control purposes, the slot closure 92 will move therewith, endwise of the case.

As a means of positioning the lever 88 in certain predetermined positions, preferably in its several "neutral" or overrunning positions, I have provided a notching arrangement, best shown in Fig. 3, as consisting of one or more inverted U-shaped members 93, which may be bolted to the top of the case, each member 93 being provided with a well portion 94, containing a spring 95, bearing on a socket member 96, which in turn engages a plunger or ball 97. The ball is adapted to occupy, selectively, depressions or notches 98, in the slot closure 92. It will appear that the spacing of the notches 98 is determined by, although not necessarily equal to, the spacing between the several clutch actuating heads 72—74, and hence the spacing between centers of gears 47, 51 and 55. Actuation of the slot closure and notching device 92 may be effected as through a pair of trunnions 99, engaging projections 100 on the slot closure.

The operation of the device is thought to be apparent from the foregoing description of its parts, but may be briefly reviewed for sake of completeness as follows:

As shown in Fig. 1, the driving head 69 occupies a position corresponding to the usual "neutral" position of conventional transmission assemblies. Assuming, for example, that it is desired to drive the associated vehicle in first or low speed, lever 88 is shifted to the right (Fig. 1) causing the driving head 69 to be moved to the left, a distance to bring the driving head to occupy the interior of the gear 55, in which position the pawls 49 within the gear 55, abut substantially as shown in Fig. 4, at least a pair of the diametrally opposite radial arms 70. Upon the head 69 being moved into its gear-engaging position, the pawls 49 are, if necessary, deflected, each about its own axis so as to clear the arms 70. This result is accomplished through cam surfaces 101, (Fig. 6), formed on each end of certain of the pawls 49, so that there is effectively prevented any endwise abutment between the arms 70 and the pawls 49 as the driving head is brought into any one of the gears, and this effect is accomplished during movement in either direction of the driving head 69. Assuming the driving head to occupy the bore or passageway through gear 55, the clutch actuating head 74 will impinge upon the inner ends of one group of plungers 26 so as to urge the parts of the friction clutch into engagement. Driving then takes place through the clutch, shaft 33, gears 47, 60, 62 and 55, the last named gear serving to rotate shaft 67, which then operates through its splined end, to rotate the shaft 65 at a relatively low speed. As it is desired to increase the speed ratio, the head 69 is moved to the left (Fig. 1) into the well portion between gears 55 and 51, the arms 70 then being out of engagement with the pawls of either of gears 55 or 51. At the same time the plungers 26 are moved by springs 31 to a retracted position, with their ends between clutch actuating heads 73 and 74. In analogous manner, as the driving head 69 is brought further to the left (Fig. 1), into the gear 51, the friction clutch is again actuated through the head 73, and driving takes place through shaft 33, gears 47, 60, 61 and 51 in order, actuating the shaft 67 and therethrough the shaft 65. It will appear that, as the shaft 67 is moved still further to the left, clutch-actuating head 72 again, following previous release, engages the friction clutch; the driving head 69 occupies the interior of gear 47, which provides the "high" or direct drive relation of parts. In this relation of parts, the hollow shaft 33 through pawls 49 therein, serves directly to engage the driving head 69 without the operative intervention of any other gears of the transmission.

Reverse position of the assembly occurs through the placement of the driving head 69 within the gear 57 so that the arms 70 engage the pawls 49 therein. At the same time the clutch-actuating head 75 engages the set of rigid plungers 26, causing actuation of the clutch, and driving takes place through the clutch, hollow shaft 33, gears 47, 60, 63, 64 and 57. Because of the added gear 64, in the train, it will be obvious that with this relation of parts, the shaft 65 will be rotated in a direction opposite to that produced through any of the other gears.

It will appear that, due to the difference in radial length between the group of hinged plungers 26, and the rigid plungers, and the larger diameter of clutch actuating head 75, the rigid plungers 26 will be actuated, in the present example, only in the reverse control position.

Since it is usually undesirable to cause a series or sequence of clutch engaging and disengaging movements, when moving the control from a higher speed ratio to a lower, it will be seen that the inner ends of the hinged group of plungers 26, may be deflected as to the right, (Fig. 1) against the undercut portions 40 of the shaft 33, so that, as the shaft 67 is moved to the right (Fig. 1), while the clutch is initially disengaged, it is engaged only when this shaft is again moved to the left. The hinging action or deflection of the inner ends of the hinged plungers 26, takes place by virtue of the movement of the radially innermost portions about the pivots 27 and against the loading of leaf springs or the like 102, which tend to bias the plunger parts into the position shown.

It will be seen that, by virtue of the provision of well portions or zones of repose between the adjacent driving gears 47—51, etc., which zones are at least equal in length to that of arms 70, the advantages of an over-running clutch are obtained merely upon moving the lever 88, for example, to the slight extent necessary to bring the driving head 69 out of the well 48 and into the adjacent pocket between gears 47 and 51; driving engagement may then be effected as desired, through movement of the driving head back into the well 48 in gear 47. The same facilities are provided between the gears 51 and 55, and likewise between gears 55 and 57. It will further appear that, by virtue of the resilient mounting of pawls 49 in each of the driving gears, and by virtue of the coaction of cam surfaces 101, during control movement, the shaft 67 may be moved, with almost no effort, into and through any one of the driving gears without the necessity, formerly existing in the case of progressive transmissions, of pausing at least momentarily in shifting the controls from one speed ratio into the next. With the present device, the lever 88 may be moved from either extreme of its range, continuously through to the other extreme, without any apparent obstruction to its movement as the head 69 passes through any one of the forward driving gears.

The relation of the driving gears and the clutch actuating head portions 72—75 is, in production, such that the driving head is brought into full operative connection with the selected driving gear, slightly in advance of full frictional engagement of the clutch parts, thereby avoiding any tendency to grabbing, jerking or the like, through premature engagement of the transmission control members.

My preference in applying the assembly described, to an automotive vehicle, is to employ a mechanical or other connection between the shifting lever 88, or some part operatively associated therewith, and the engine throttle, in such a manner that, as the shaft 67 is progressed from one control position to the next, the automotive engine is accelerated to an extent exactly commensurate with the change in speed ratio through the transmission. An automotive throttle control for this purpose constitutes the subject matter of my copending application Serial No. 591,590, filed February 8, 1932.

It will appear that the device described serves materially to simplify the heretofore prevailing multiplicity of control elements, by providing, in accordance with the several objects above enumerated, a perfectly coordinated clutch and speed change control. It will also appear that the device is simple and of a rugged nature, embodying all of the advantages of a progressive type transmission, while avoiding the older disadvantages, at the same time providing a smoothness of speed control heretofore unattained through the use of a transmission of constant mesh type, by coordinating therewith a synchronizing device of simple and sturdy form.

While the foregoing description has described in detail the presently preferred embodiment of the invention, it is to be understood that the device may be varied substantially in the parts shown, and their arrangement and combinations, as well as in the intended use of the device, without departing from the full scope and spirit of the invention, as defined by the appended claims.

I claim:

1. In an assembly including a friction clutch and a gear-type transmission, a gear-driven member, movable along its axis for speed-change control purposes, a control element common to said clutch and member, and a plurality of gear-engaging and clutch-actuating projections on said member, said projections being so arranged and spaced as to coordinate, in a definite sequence, the control movements of the clutch and transmission, as the control element is moved in one direction.

2. In a power transmission of gear type, a clutch assembly, a power shaft having an axial bore, a speed-change control member operable in said bore, an element carried by said member adapted for interlocking engagement with gears of the transmission, and a second element, spaced from the first, and operable within said bore, in controlling association with said clutch assembly.

3. In a power transmission and clutch assembly including shafts and gearing, an extensible power shaft structure formed of aligned portions adapted for relative axial movement for purposes of speed change control, a friction clutch, a clutch-actuating member extending into the path of one shaft portion, a projection carried by said shaft portion and adapted to engage the clutch-actuating member upon predetermined control movements of the last said shaft portion.

4. A control assembly for a motor vehicle, including a friction clutch, a control shaft therefor movable axially of the clutch, a speed-change control member formed as an aligned extension of the clutch control shaft, and a manual control element common to said members.

5. In a control assembly for a motor vehicle, a gear-type transmission, a friction clutch, a control member movable axially of, and having a control connection with said clutch, said connection including a transmission power shaft adapted for movement into selective driving connection with certain of the gears of the transmission, and means for moving said power shaft concurrently with said control member.

6. In a control assembly for a motor vehicle, including a friction clutch and a transmission, a speed-change control lever, a driven power shaft in the transmission, movable axially through movement of said lever for purposes of speed-change control, and cams carried by the power shaft, for actuating said clutch, as the shaft is moved for purposes of transmission control.

7. In a control assembly for a motor vehicle including a friction clutch and transmission, a shifting lever associated with said transmission, an axially movable power shaft in the transmission, arranged for control through said lever, and means for actuating said friction clutch responsively to predetermined movements of said lever, said means including a clutch-controlling cam shaft, forming an extension of said power shaft.

8. In an assembly including a gear-type transmission and a friction clutch, a power shaft section, means for manually moving said shaft section for control purposes, and spaced clutch-actuating and gear-engaging portions on said shaft section.

9. In a transmission and clutch assembly, a plurality of spaced driving gears, a friction clutch coaxial therewith and spaced therefrom, a power take-off member movable axially of the gears, a driving head on said member, for selective connection with the gears, and a plurality of clutch-actuating cams carried by said member, spaced from said head and spaced from each other proportionately to the spacing of the gears.

10. In a friction clutch and transmission assembly, a plurality of gears, a passageway through said gears, a power shaft movable within said passageway and a pair of projections on said shaft, one of said projections arranged for driving connection, selectively, with said gears, and the other projection arranged for actuation of the clutch.

11. In an assembly including a transmission and friction clutch, a plurality of centrally apertured, coaxially arranged gears, a shaft arranged to be driven selectively by the gears, a driving head on said shaft movable selectively into the apertures of the gears, and a clutch-actuating head on said shaft, so spaced from said driving head as to be brought into clutch actuating position, substantially upon movement of the driving head into one of said gears.

12. In an assembly including a friction clutch and a speed-change transmission, a plurality of gears, a passageway through said gears, a shaft movable axially of said passageway to effect a speed-change control, through selective engagement with said gears, projections on the shaft, adapted respectively for driving connection selectively with the gears, and for actuation of the friction clutch, and means associated with said axially movable shaft and said gears, for synchronizing the speed of rotation of said shaft and one of said gears, in advance of operative engagement between the shaft and the gear to be operatively engaged thereby.

13. In a transmission assembly including speed change gears and a friction clutch, a shiftable power shaft adapted, upon shifting movement, to cause engagement and disengagement of the clutch, and to effect changes in effective gear ratio, means carried by the shaft for synchronizing the actuation of the friction clutch with speed change control movements, and means associated with the shaft, for synchronizing the speed of a gear to be engaged, with that of the shaft, in advance of operative connection of the shaft with such gear.

14. A transmission assembly including, in combination with a friction clutch, a plurality of coaxially disposed gears, an endwise movable driven shaft, adapted for operative engagement with said gears, one at a time, means carried in part by said shaft for synchronizing the speed of the shaft and each of said gears in advance of their operative engagement, means carried by the shaft for effecting a selective operative engagement with a gear, and means, also carried by the shaft, for actuating the friction clutch, in predetermined timed relation relative to the operative connection of said shaft with the several gears.

15. In a structure including, in combination in a speed change transmission of gear type, a power take-off shaft section associated with the transmission and movable endwise through certain of the gears thereof for speed change control purposes, a driving head on said shaft section, means forming a plurality of driving zones for the reception of and operative engagement with said driving head, certain of said zones being within said gears, and a zone of repose adjacent one of said driving zones, and a gear-engaging member on the shaft section adjacent said driving head, tending to bring each gear to the rotative speed of the said shaft section, prior to operative engagement of the gear by the driving head.

16. In a transmisson assembly, a friction clutch, a plurality of coaxially arranged gears, an endwise shiftable power shaft section, a gear-engaging head carried by said shaft section, the gears being constructed and spaced to form pockets, alternately arranged for operative and inoperative reception of said driving head, and a plurality of clutch-actuating heads spaced on said shaft section substantially conformably to the center-spacing of said gears.

17. In a power transmission assembly of gear type, a power, a shaft having a gear-engaging head, and movable axially to effect changes in effective gear ratio through the transmission, the transmission gears forming a passageway for said shaft, a control lever for moving said shaft, and elements carried by said shaft and gears, cooperating to synchronize the speed of the shaft and a gear in advance of their operative engagement.

18. In a transmission and clutch assembly, a manual control lever, control connections arranged respectively between said lever and speed change elements of said transmission and the clutch, a rotatable structure formed of aligned hollow gear elements, extending from the clutch into the transmission, a combined driven shaft and control member operable within and along the said rotatable structure, clutch-actuating and gear-interlocking means, spaced along and extending into said rotatable structure, and cooperative means on said control member, adapted upon control movement thereof, to effect actuation of the clutch and a transmission control movement.

19. In a transmission assembly including a friction clutch and speed-change gearing, a hollow shaft carrying the clutch, clutch actuating-elements extending into the hollow shaft, a plurality of coaxially arranged hollow gears, aligned with, and forming a bore as a continuation of that in the clutch shaft, a power shaft shiftable endwise in said bore and adapted to be brought selectively into connection with said gears, and arranged thereupon to be brought into operative engagement with said clutch-actuating elements.

20. In a power transmission assembly, a clutch, a shiftable control shaft, a transmission gear, diametrally arranged lug elements and spring pressed pawl elements adapted to coact to bring the gear and shifting shaft into operative relation, one set of said elements being disposed on said shaft, the other set of said elements being disposed on the gear, cam surfaces on one set of said elements, adapted to permit free endwise movement of the control shaft into operative connection with the gear, and a clutch-actuating cam on said shaft.

EUGENE S. BUSH.